W. THORNLEY.
Attaching Hubs to Axles.
No. 11,705.
Patented Sept. 19, 1854
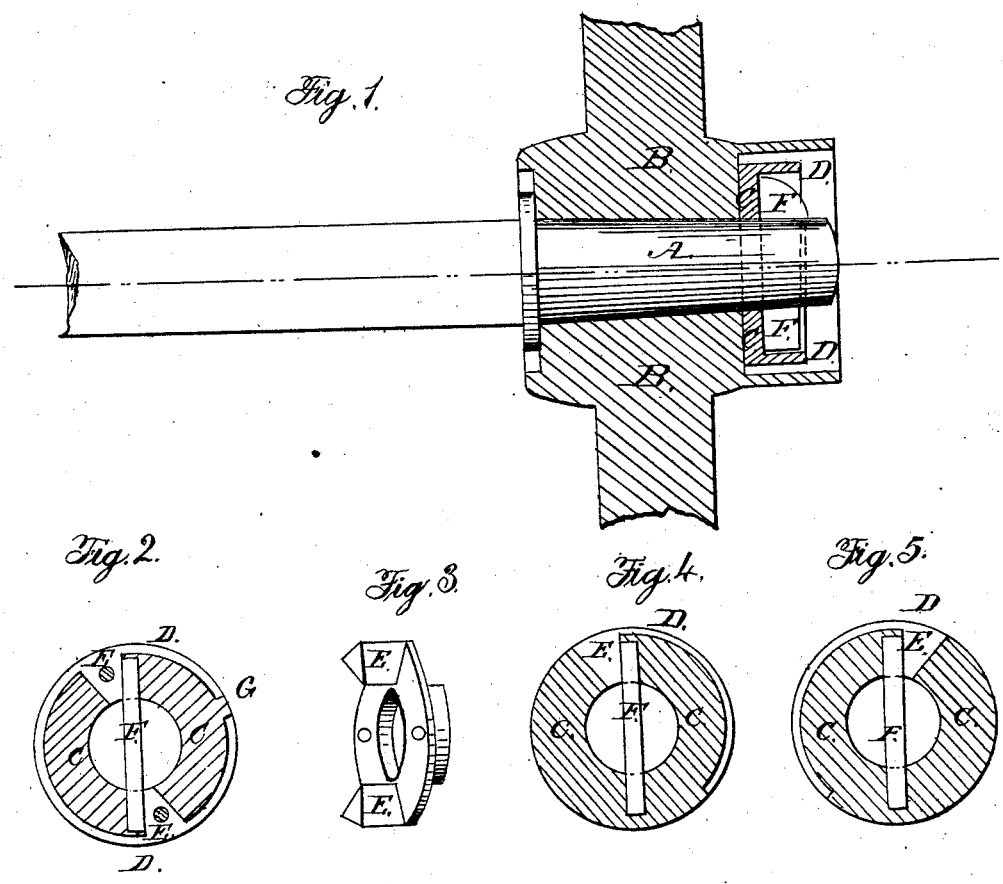

2 Sheets—Sheet 2.
W. THORNLEY.
Attaching Hubs to Axles
No 11,705.  Patented Sept. 19, 1854.
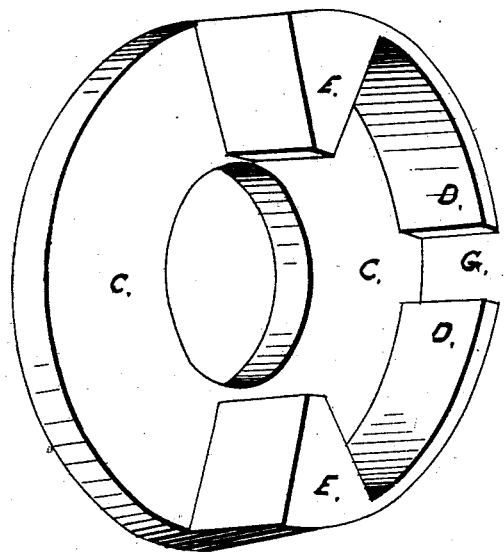

UNITED STATES PATENT OFFICE.

WILLIAM THORNLEY, OF PHILADELPHIA, PENNSYLVANIA.

SAFETY-WASHER FOR SECURING WHEELS TO AXLES.

Specification of Letters Patent No. 11,705, dated September 19, 1854.

*To all whom it may concern:*

Be it known that I, WILLIAM THORNLEY, of the city of Philadelphia, in the State of Pennsylvania, have invented a new and useful Improvement in the Means of Securing Linchpins in the Axles of Carts, Carriages, Drays, Wagons, and other Vehicles, which is described as follows, reference being had to the annexed drawings of the same, making part of this specficiation.

Figure 1 is a transverse section of a portion of an axle, showing the hub of the wheel, the linch pin, and the washer, by which the pin is retained in its proper position. Fig. 2 is a detached view of the washer showing its projecting flange and stops and their relation with the linch pin. Fig. 3 is a detached view of the cap which may be used on light vehicles which entirely incloses the linch pin from view and also prevents the washer or pin from moving when it is adjusted.

The nature of this invention consists in a washer, to be placed between the hub of the wheel and the linch pin, which washer is provided with a flange, projecting at right angles from its face outward, over the linch pin, together with the stop or stops, projecting in the same direction and extending from the inner diameter of said flange toward the center of the washer. In case of two stops being used, they are so arranged that by the motion of the wheel in either direction, they by the friction of the hub against the washer are brought in contact, one with the head the other with the point of the linch pin, in which position they remain when the wheel is in motion. The length of the linch pin being less than the inner diameter of the projecting flange, which flange is provided with a slot through which the pin is adjusted, the slot standing at right angles with the centers of the stops, so that the linch pin, when the wheel is in motion, is encircled by the projecting flange of the washer, thereby rendering it impossible for the linch pin to be removed except the washer be turned in a contrary direction from that of the wheel. The advantages of this improvement over the means usually employed, for keeping linch pins in their proper positions, are obvious, as apart from the impossibility of the pin escaping it is also impossible for it to drop out should the head be broken off, or the pin itself be broken through its center, as that portion of the flange of the washer which passes or stands beneath the point of the pin is solid. Another advantage arising from the use of this improvement, is that the linch pin is subject to no wear, except that caused by the washer in making something less than one half a revolution each time the motion of the wheel is reversed as in backing, the greater amount of wear being confined to the hub of the wheel and inside face of the washer.

To take up the lost motion or play thus caused I propose, in applying my washer to axles, to have the slot for the reception of the linch pin greater in length than the width of the pin when first applied, so as to admit of the application of pins, of a greater width when required, thereby obviating the necessity of applying new washers for that purpose. The many accidents that have and are liable to occur from the deficiency in the present mode of securing linch pins in axles, makes this invention one of value to the public.

To enable others skilled in the art to make and use my invention I shall describe its construction and operation.

A, is the axle; B, the hub of the wheel; C, the washer; D, its projecting flange; G, the slot for the adjustment of the linch pin F.

E E, are the stops with which the linch pin F is shown in contact. The direction of the wheel being from left to right.

Fig. 3 is the cap with the projecting stop which stands at right angles with the stop on Fig. 2 when adjusted and closes the linch pin slot.

The washers shown in Figs. 4, and 5, are designed to protect the head of the pin F only. Their flanges not extending farther around the circumference of the washer, C, than to intersect a line drawn from and parallel with the outside face of the stop E. As washers having a partial flange and single stop require to be made right and left and only prevent the linch pin from coming out upward, washers provided with a continuous flange and two stops are thought to be preferable.

5  What I claim as my invention, and desire to secure by Letters Patent, is—

A washer having a projecting flange, and stop or stops, also the cap with the stop or stops as described for the purpose specified.

WM. THORNLEY.

Witneses:
  MASON NAYLOR,
  ROBERT LISTER.